Jan. 27, 1931.  C. FISCHER  1,790,500
DUPLEX FLEXIBLE SUPPORTING ARM
Filed Feb. 10, 1928
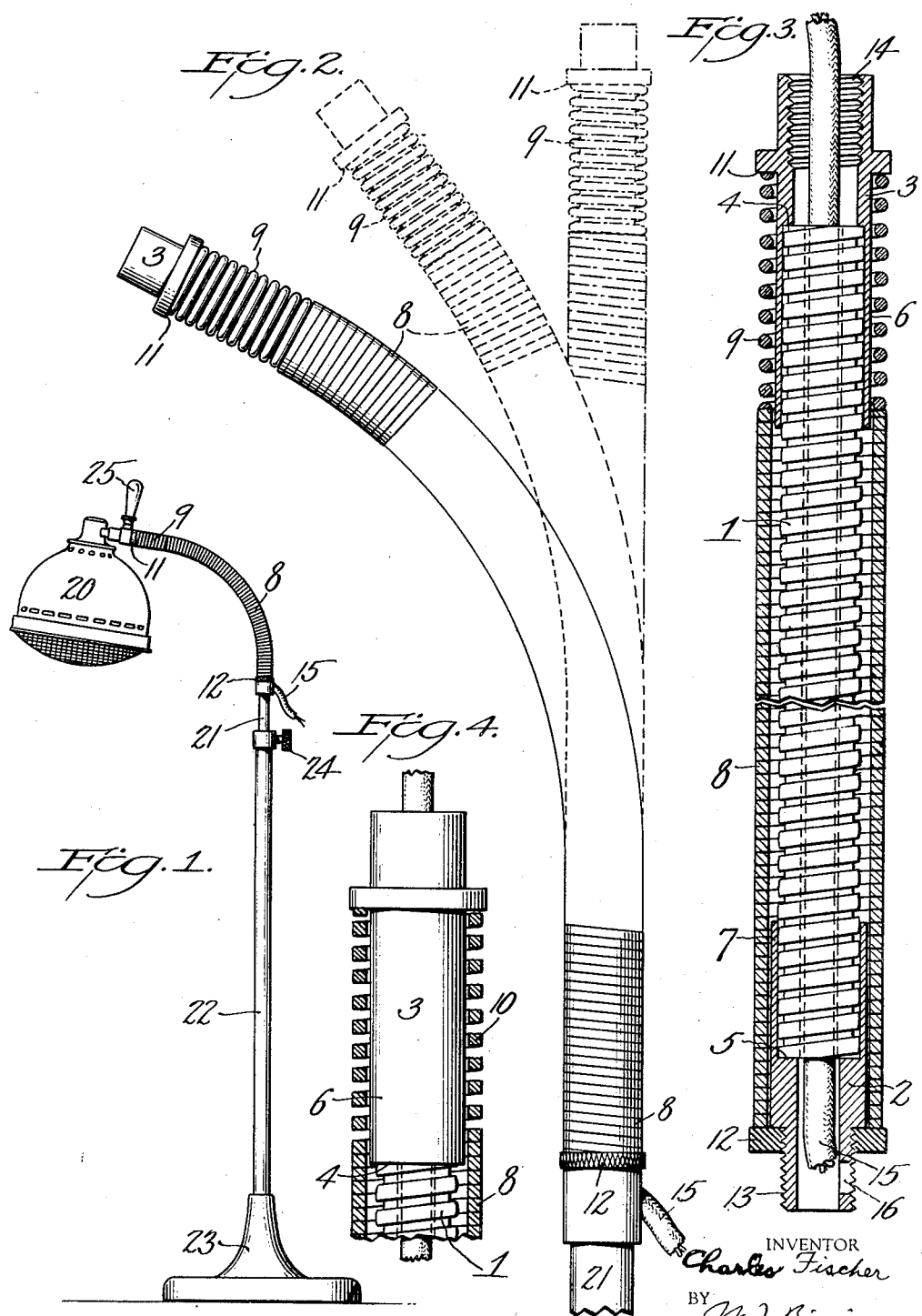
INVENTOR
Charles Fischer
BY W. J. Bissing
ATTORNEY Patented Jan. 27, 1931

1,790,500

UNITED STATES PATENT OFFICE

CHARLES FISCHER, OF NEW YORK, N. Y.

DUPLEX FLEXIBLE SUPPORTING ARM

Application filed February 10, 1928. Serial No. 253,245.

My invention relates to flexible supporting arms for supporting electric lamps and, more particularly, to a duplex, stiff, flexible supporting arm, which is adapted to support a heavy object, such as a lamp or the like and in which the outer casing consists of a flexible, spiral spring provided with a compensating compression spring, which will offer substantial resistance to flexing and which is thus enabled to adjustably support a heavy lamp. The expansion and contraction of the spiral spring as the arm is bent and returned, is compensated for and taken up by the compensating spring.
One of the objects of my invention is to provide a duplex, flexible arm consisting of a flexible core, a closely wound, spiral spring of rectangular cross-section, surrounding the core and a compensating spring adjacent to one end of the spiral spring, the said arm being thus adapted to be adjusted into several positions and to support a heavy lamp.

With the above and other objects in view, my invention consists in the parts, improvements and combinations more fully pointed out hereinafter.

Turning now to the drawings:

Figure 1 is a side elevation of the duplex, flexible arm, showing the arm in place when supporting a heavy lamp.

Figure 2, is a side elevation of the arm showing in full lines the arm bent in lamp-supporting position, at the same time showing in dotted lines, the arm when straightened and also in an intermediate position.

Figure 3, is a longitudinal, transverse section through the arm, and

Figure 4, is a detail view, partly in section, of one end of another form of arm.
A flexible core 1, preferably made of metal, is provided, whose ends, respectively, pass within and are secured to sleeves 2 and 3. The sleeves are provided, respectively, with shoulders 4, 5, and with skirt portions 6, 7, so that the sleeves may be driven over the ends of the core 1, making a friction fit between the core and sleeves until the ends of the core abut against the respective shoulders 4, 5, of sleeves 2, 3.
In order to provide a flexible arm which will support a heavy load and which can be easily flexed, adjusted and bent into any of several supporting positions for a heavy lamp, I provide a closely wound, spiral spring 8, of rectangular cross-section, which spring surrounds the core 1. A compensating compression spring 9 of shorter length than the spiral spring, is arranged adjacent to one end of the rectangular spring 8, and may consist either of a separate spring, as shown in Figure 3, or may be an integral portion of the rectangular spring 8, as shown in Figure 4.

As shown in Figures 3 and 4, the coils of the compensating spring are loosely wound and further apart than the coils of the rectangular spring 8, so as to make the compensating spring more compressible and resilient.

As shown in Figure 4, the compensating spring 10, is an integral prolongation of the rectangular spring 8, and surrounds the sleeve 3, into which the flexible core projects.

In order to place the rectangular and compensating springs under compression and thereby increase their resistance to flexing, so as to support a heavier load, one end of the compensating spring abuts against an abutment, such as a collar 11, formed on the sleeve 3, and the outer end of the rectangular spring 8, abuts against an adjustable collar 12, which can be screwed on the screw-threaded portion 13 of sleeve 2. By screwing or unscrewing the collar 12, the flat spiral spring and the compensating spring can be placed under more or less compression. By this means the desired range of flexion or bending of the arm can be maintained with lamps of different weights.

The core of the arm is hollow so as to receive an electric cable 15, in which the wires are placed for supplying the current to the lamp, the cable entering the sleeve 2, through opening 16.

The lamp 20, is secured to one end of the arm by the screw-threaded portion 14, the other end of the arm being mounted on a vertically adjustable post 21, supported in a tube 22, on base 23. The post 21, may be adjustably secured by screw 24, and the arm may be flexed and set in position by handle 25.

Having thus described the invention, its operation will be clear. It will be understood that changes may be made in carrying the invention into effect, without departing from the principle of the invention.

What I claim is:

1. A duplex flexible supporting arm for supporting a heavy object comprising in combination, a hollow, flexible core, a spiral, flexion spring surrounding said core, and a compensating compression spring of shorter length than said spiral spring adjacent to one end of said spiral spring, which compensates for the expansion and contraction of the spiral spring when the arm is bent.

2. A duplex flexible supporting arm for supporting a heavy object comprising in combination, a hollow, flexible core, a spiral, flexion spring of rectangular cross-section surrounding said core, a short compensating compression spring of shorter length than said spiral spring adjacent to the end of said spiral spring, an abutment for said compensating spring, a hollow sleeve into which one end of the flexible core projects, the exterior of the outer end of said sleeve being screw-threaded and a nut mounted on said screw-threaded exterior of the sleeve, and adapted to engage one end of said spiral spring so as to compress it.

3. A duplex flexible supporting arm for supporting a heavy object comprising in combination, a flexible core, a spiral, flexion spring of rectangular cross-section surrounding said core, a short compensating compression spring of shorter length than said spiral spring adjacent to the end of said spiral spring, a hollow sleeve into which one end of the flexible core projects, the exterior of the outer end of said sleeve being screw-threaded, a nut mounted on said screw-threaded exterior of the sleeve and adapted to engage one end of said spiral spring so as to compress it, and another hollow sleeve into which the other end of said core projects and about which the compensating spring is wound, said last named hollow sleeve being provided with a collar forming an abutment for the compensating spring.

In testimony whereof, I have signed my name to this specification.

CHARLES FISCHER.